(12) United States Patent
Chen

(10) Patent No.: US 9,793,839 B2
(45) Date of Patent: Oct. 17, 2017

(54) MOTOR CONTROL CIRCUIT

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/201,583

(22) Filed: Jul. 4, 2016

(65) Prior Publication Data
US 2017/0264222 A1   Sep. 14, 2017

(30) Foreign Application Priority Data

Mar. 14, 2016   (TW) .............................. 105107767 A

(51) Int. Cl.
*H02P 6/16*   (2016.01)
*H02P 27/06*   (2006.01)

(52) U.S. Cl.
CPC ................ *H02P 6/16* (2013.01); *H02P 27/06* (2013.01)

(58) Field of Classification Search
CPC ........... H02P 6/16; H02P 27/06; H02P 25/032
USPC ....... 318/443, 102, 119, 162, 281, 431, 444, 318/445
See application file for complete search history.

(56) References Cited

U.S. PATENT DOCUMENTS

| | | | | |
|---|---|---|---|---|
| 5,391,080 A * | 2/1995 | Bernacki | ................ | A63B 69/12 434/254 |
| 5,442,266 A * | 8/1995 | Morehouse | ............ | G11B 21/12 318/272 |
| 5,469,033 A * | 11/1995 | Huang | ..................... | H02P 6/185 318/400.01 |
| 6,194,856 B1 * | 2/2001 | Kobayashi | ............ | H02M 7/003 318/432 |
| 6,208,497 B1 * | 3/2001 | Seale | ........................ | F01L 9/04 361/154 |
| 6,459,955 B1 * | 10/2002 | Bartsch | ..................... | A47L 9/00 318/568.11 |
| 6,942,469 B2 * | 9/2005 | Seale | ........................ | F01L 9/04 417/413.1 |

(Continued)

FOREIGN PATENT DOCUMENTS

TW    201330488 A    7/2013

*Primary Examiner* — Rita Leykin
(74) *Attorney, Agent, or Firm* — Li & Cai Intellectual Property (USA) Office

(57) ABSTRACT

A motor control circuit is disclosed, which uses one hall sensor to sense the position of the magnetic poles of three-phase motor, and to execute phase switching mechanism by start controller and operation controller. The motor control circuit drives the three-phase motor from a start state to a normal operation state. In the start state, the start controller controls the switching time and controls storage to transmit the digital models of the phase switching to the operation controller. The operation controller executes the phase switching of the full-bridge circuit according to the received digital models, to drive the three-phase motor. In the normal operation state, the start controller stops transmitting the digital models of the phase switching to the operation controller. The operation controller captures six digital models in sequence once every switching time, and executes the phase switching of the full-bridge circuit, to drive the three-phase motor.

10 Claims, 5 Drawing Sheets

(56) References Cited

U.S. PATENT DOCUMENTS 8,044,623 B2 * 10/2011 Takeuchi ................. H02P 6/16
318/400.13
8,783,396 B2 * 7/2014 Bowman ................. B60K 6/46
180/65.285

* cited by examiner

MOTOR CONTROL CIRCUIT

BACKGROUND

1. Technical Field

The present disclosure relates to a motor control circuit, in particular, to a motor control circuit which utilizes one hall sensor to achieve the phase commutation of a magnetic pole of a three-phase motor.

2. Description of Related Art

A motor is constituted by a stator and a rotor disposed opposite to each other. The motor control circuit can rotate with respect to the stator to operate the motor by the magnetic force and magnetic field change, thereby rotating for example a fan configured in the motor. The magnetic field change represents the phase commutation of the magnetic poles of the motor.

Generally speaking, three hall sensors are used to carry out the phase commutation in the present three-phase motor driving method. More specifically, three hall sensors sense the position of the magnetic poles of the motor (or the magnetic field change) so as to determine the position of the rotor. Then, each of three hall sensors accordingly generates a phase switching signal to control the switch of the coil current in the stator, thereby achieving the phase commutation. With the miniaturization of the three-phase motor technology, the volume of the three-phase motor has also gradually decreased.

However, number of the hall sensors is not as easy to miniaturize as the three-phase motor. Therefore, if the number of the hall sensors can be decreased and the phase commutation of the magnetic poles of the three-phase motor can be achieved, this helps the development of miniaturizing the three-phase motor.

SUMMARY

An exemplary embodiment of the present disclosure provides a motor control circuit. The motor control circuit is adapted for driving a three-phase motor from a start state to a normal operation state. The motor control circuit includes a full-bridge circuit, a hall sensor, a storage, a start controller, and an operation controller. The full-bridge circuit is electrically connected to the three-phase motor. The hall sensor is configured close to the three-phase motor, and is configured for sensing a position of magnetic poles of the three-phase motor to generate a hall signal. The storage is electrically connected to the hall sensor and is configured for storing six digital models. The six digital models have sequential relationship and are associated with a phase switching of the full-bridge circuit, to provide the operation of the three-phase motor. The start controller is electrically connected to the hall sensor and the storage. The operation controller is electrically connected to the hall sensor, the storage, and the full-bridge circuit. In the start state, when the start controller receives a start signal indicating start of the motor control circuit, the start controller periodically generates a commutation signal, the storage transmits the digital models in sequence to the operation controller starting from the first digital model according to the level of the commutation signal and the level of the hall signal, and the operation controller executes the phase switching of the full-bridge circuit according to the digital models received in sequence, to drive the three-phase motor. In the start state, when the start controller determines that there is a first level conversion of the hall signal, the start controller periodically generates the commutation signal, the storage transmits the fourth, the fifth, and the sixth digital models in sequence to the operation controller according to the commutation signal and the level conversion, and the operation controller executes the phase switching of the full-bridge circuit according to the digital models received in sequence, to drive the three-phase motor. In the start state, when the start controller determines that there is the second level conversion of the hall signal, the operation controller averages a total time of the fourth, the fifth, and the sixth digital models to generate a switching time, to enter the normal operation state, wherein in the normal operation state, the operation controller captures six digital models in sequence from the storage once every switching time, and executes the phase switching of the full-bridge circuit according to the switching time.

An exemplary embodiment of the present disclosure provides a motor control circuit. The motor control circuit is adapted for driving a three-phase motor from a start state to a normal operation state. The motor control circuit includes a full-bridge circuit, a hall sensor, a storage, a start controller, and an operation controller. The full-bridge circuit is electrically connected to the three-phase motor. The hall sensor is configured close to the three-phase motor, and is configured for sensing a position of magnetic poles of the three-phase motor to generate a hall signal. The storage is electrically connected to the hall sensor and is configured for storing six digital models. The six digital models have sequential relationship and are associated with a phase switching of the full-bridge circuit, to provide the operation of the three-phase motor. The start controller is electrically connected to the hall sensor and the storage. The operation controller is electrically connected to the hall sensor, the storage, and the full-bridge circuit. In the start state, when the start controller receives a start signal indicating start of the motor control circuit, the start controller periodically generates a commutation signal, the storage transmits the digital models in sequence to the operation controller starting from the fourth digital model according to the level of the commutation signal and the level of the hall signal, and the operation controller executes the phase switching of the full-bridge circuit according to the digital models received in sequence, to drive the three-phase motor. In the start state, when the start controller determines that there is a first level conversion of the hall signal, the start controller periodically generates the commutation signal, the storage transmits the first, the second, and the third digital models in sequence to the operation controller according to the commutation signal and the level conversion, and the operation controller executes the phase switching of the full-bridge circuit according to the digital models received in sequence, to drive the three-phase motor. In the start state, when the start controller determines that there is the second level conversion of the hall signal, the operation controller averages a total time of the first, the second, and the third digital models to generate a switching time, to enter the normal operation state, wherein in the normal operation state, the operation controller captures six digital models in sequence from the storage once every switching time, and executes the phase switching of the full-bridge circuit according to the switching time.

To sum up, the exemplary embodiments of the present disclosure provide a motor control circuit, which utilizes one hall sensor to sense the position of magnetic poles of the three-phase motor and operates the three-phase motor by a phase switching mechanism. Therefore, the motor control circuit utilizes one hall sensor to achieve the phase commutation of the magnetic poles of the three-phase motor, thereby miniaturizing the three-phase motor.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
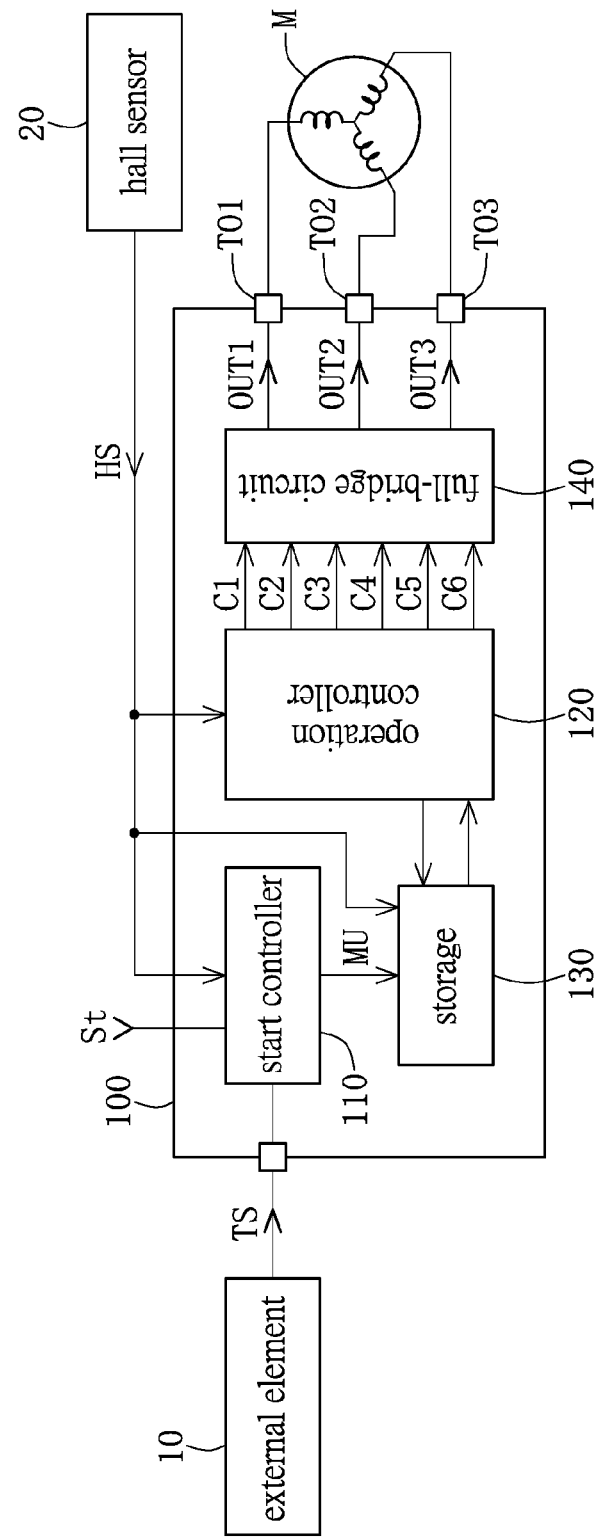
FIG. 1 shows a block diagram of a motor control circuit according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a motor control circuit, which utilizes one hall sensor to sense the position of magnetic poles of the three-phase motor, and to execute a phase switching mechanism by a start controller and an operation controller, so that the motor control circuit drives the three-phase motor from a start state to a normal operation state (i.e., the three-phase motor operates from stop to the normal operation). More specifically, in the start state, the start controller controls the switching time and controls storage to transmit the digital models of the phase switching to the operation controller. The operation controller executes the phase switching of the full-bridge circuit according to the received digital models, to drive the three-phase motor. In the normal operation state, the start controller stops controlling the storage. The operation controller captures six digital models in sequence from the storage once every switching time, and accordingly executes the phase switching of the full-bridge circuit, to drive the three-phase motor. Accordingly, the motor control circuit utilizes one hall sensor to achieve the phase commutation of the magnetic poles of the three-phase motor, thereby miniaturizing the three-phase motor. The motor control circuit provided in the exemplary embodiment of the present disclosure will be described in the following paragraphs.

Firstly, please refer to FIG. 1, which shows a block diagram of a motor control circuit according to an exemplary embodiment of the present disclosure. As shown in FIG. 1, the motor control circuit 100 drives a three-phase motor M from a start state to a normal operation state (i.e., the three-phase motor M operates from stop to the normal operation) according to a stator and a rotor (not shown in FIGs) opposite to the three-phase motor M. More specifically, the rotor can rotate with respect to the stator to operate the three-phase motor M by the magnetic force and magnetic field change.

The motor control circuit 100 includes a full-bridge circuit 140, a storage 130, a hall sensor 20, a start controller 110, and an operation controller 120. The full-bridge circuit 140 is electrically connected to the three-phase motor M. The storage 130 is electrically connected to the hall sensor 20 and stores six digital models. The six digital models have sequential relationship and are associated with a phase switching of the full-bridge circuit 140, to provide the operation of the three-phase motor M. The operation controller 120 is electrically connected to the storage 130, the full-bridge circuit 140, and the hall sensor 20. The operation controller 120 executes the phase switching of the full-bridge circuit 140 according to the digital models transmitted from the storage 130, to control the operation of the three-phase motor M.

Figure 2:
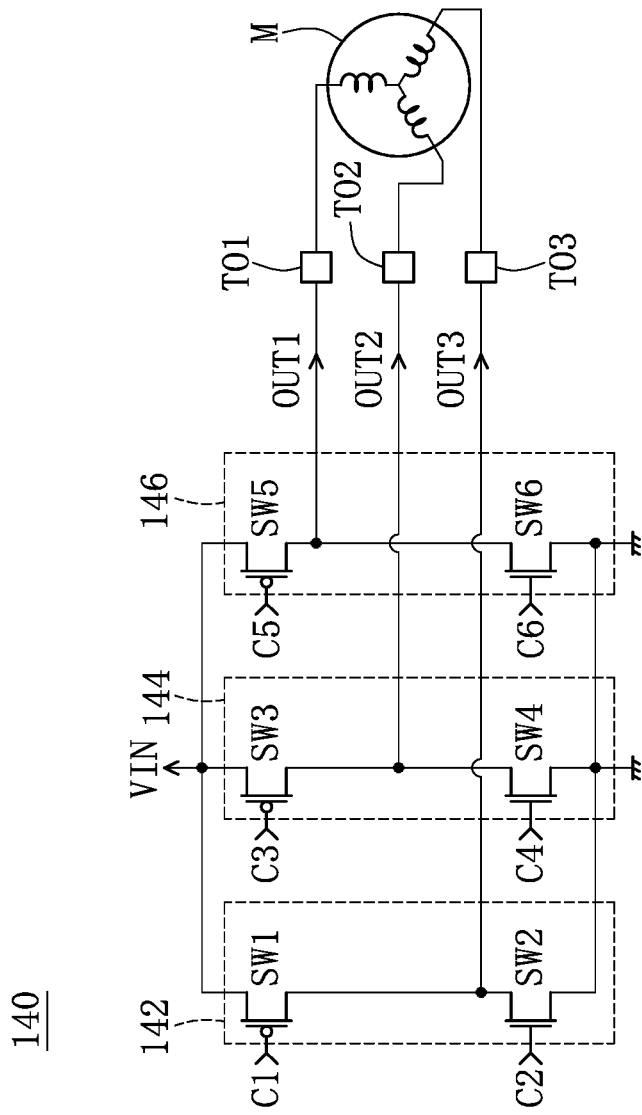
FIG. 2 shows a block diagram of a full-bridge circuit according to an exemplary embodiment of the present disclosure.

More specifically, please refer to FIG. 2, which shows a block diagram of a full-bridge circuit according to an exemplary embodiment of the present disclosure. The full-bridge circuit 140 is a three-phase full bridge circuit having three bridge-arms configured in parallel. The three bridge-arms are a first bridge-arm 142, a second bridge-arm 144, and a third bridge-arm 146 respectively. The first bridge-arm 142 has a first switch SW1 and a second switch SW2. An end of the first switch SW1 receives an input voltage VIN. Another end of the first switch SW1 electrically connects to an end of the second switch SW2. Another end of the second switch SW2 connects to ground. The second bridge-arm 144 has a third switch SW3 and a fourth switch SW4. An end of the third switch SW3 receives the input voltage VIN. Another end of the third switch SW3 electrically connects to an end of the fourth switch SW4. Another end of the fourth switch SW4 connects to ground. The third bridge-arm 146 has a fifth switch SW5 and a sixth switch SW6. An end of the fifth switch SW5 receives the input voltage VIN. Another end of the fifth switch SW5 electrically connects to an end of the sixth switch SW6. Another end of the sixth switch SW6 connects to ground. In the present disclosure, the first switch SW1, the third switch SW3, and the fifth switch SW5 are PMOS transistors, and the second switch SW2, the fourth switch SW4, and the sixth switch SW6 are NMOS transistors. The first switch SW1, the second switch SW2, the third switch SW3, the fourth switch SW4, the fifth switch SW5, and the sixth switch SW6 can be other kinds of switches, and the present disclosure is not limited thereto.

Each of the digital models stored in the storage 130 has six control signals C1, C2, C3, C4, C5, and C6 (i.e., the six control signals are associated with the phase switching of the full-bridge circuit 140). There is a sequential relationship from the first digital model to the sixth digital model, to provide the operation of the three-phase motor M. This means that when the operation controller 120 executes the phase switching of the full-bridge circuit 140 in sequence according to the first to sixth digital models, this will drive the three-phase motor M to rotate one cycle.

In the present disclosure, the control signals C1, C2, C3, C4, C5, and C6 from the first to the sixth digital models are shown in <Table 1> as follows, wherein "H" indicates a high level and "L" indicates a low level.

TABLE 1

| digital models | C1 | C2 | C3 | C4 | C5 | C6 |
|---|---|---|---|---|---|---|
| first | H | L | L | H | L | L |
| second | H | L | L | L | L | H |
| third | L | L | H | L | L | H |
| fourth | L | H | H | L | L | L |
| fifth | L | H | L | L | H | L |
| sixth | L | L | L | H | H | L |

Persons of ordinary skill in this technology field should realize that when the operation controller 120 executes the phase switching of the full-bridge circuit 140 according to the sequence of the first, second, third, fourth, fifth, and sixth digital models, this will drive the three-phase motor M to positively rotate one cycle. When the operation controller 120 executes the phase switching of the full-bridge circuit 140 according to the sequence of the fourth, fifth, sixth, first, second, and third digital models, this will drive the three-phase motor M to negatively rotate one cycle. Detailed description is omitted. The aforementioned six digital models can be other types for driving the three-phase motor M rotating one cycle. The present disclosure is not limited thereto.

Therefore, the operation controller 120 respectively controls the turn-on and turn-off of the first switch SW1, second switch SW2, third switch SW3, fourth switch SW4, fifth switch SW5, and sixth switch SW6 of the full-bridge circuit 140 according to the six control signals C1-C6 of the digital models received in sequence. Then the full-bridge circuit 140 respectively generates three phase currents to the three-phase motor M through three driving terminals TO1, TO2, and TO3 configured in the motor control circuit 100. The first driving voltage signal OUT1, the second driving voltage signal OUT2, and the third driving voltage signal OUT3 are respectively outputted from the driving terminals TO1, TO2, and TO3. This means that the first driving voltage signal OUT1 is outputted between the first switch SW1 and the second switch SW2, the second driving voltage signal OUT2 is outputted between the third switch SW3 and the fourth switch SW4, and the third driving voltage signal OUT3 is outputted between the fifth switch SW5 and the sixth switch SW6, to control the operation of the three-phase motor M. Persons of ordinary skill in this technology field should realize the implementation of the phase commutation between the three-phase motor M and the full-bridge circuit 140, and the operation of the three-phase motor M, so detailed description is omitted.

Please return to FIG. 1. The hall sensor 20 is configured to be near the three-phase motor M for sensing the position of the magnetic poles of the three-phase motor M, to accordingly generate a hall signal HS. The start controller 110 is electrically connected to the hall sensor 20 and the storage 130. In the start state, when the start controller 110 receives a start signal St indicating the start of the motor control circuit 100, the start controller 110 controls the storage 130 to transmit the corresponding digital models in sequence to the operation controller 120. In the present disclosure, the start controller 110 is electrically connected to a power supply (not shown in FIGs) of the motor control circuit 100. When the power supply is turned on, the power supply transmits the start signal St to the start controller 110. This means the start of the motor control circuit 100. The start signal St can be controlled by another electronic device and the present disclosure is not limited thereto.

Figure 3:
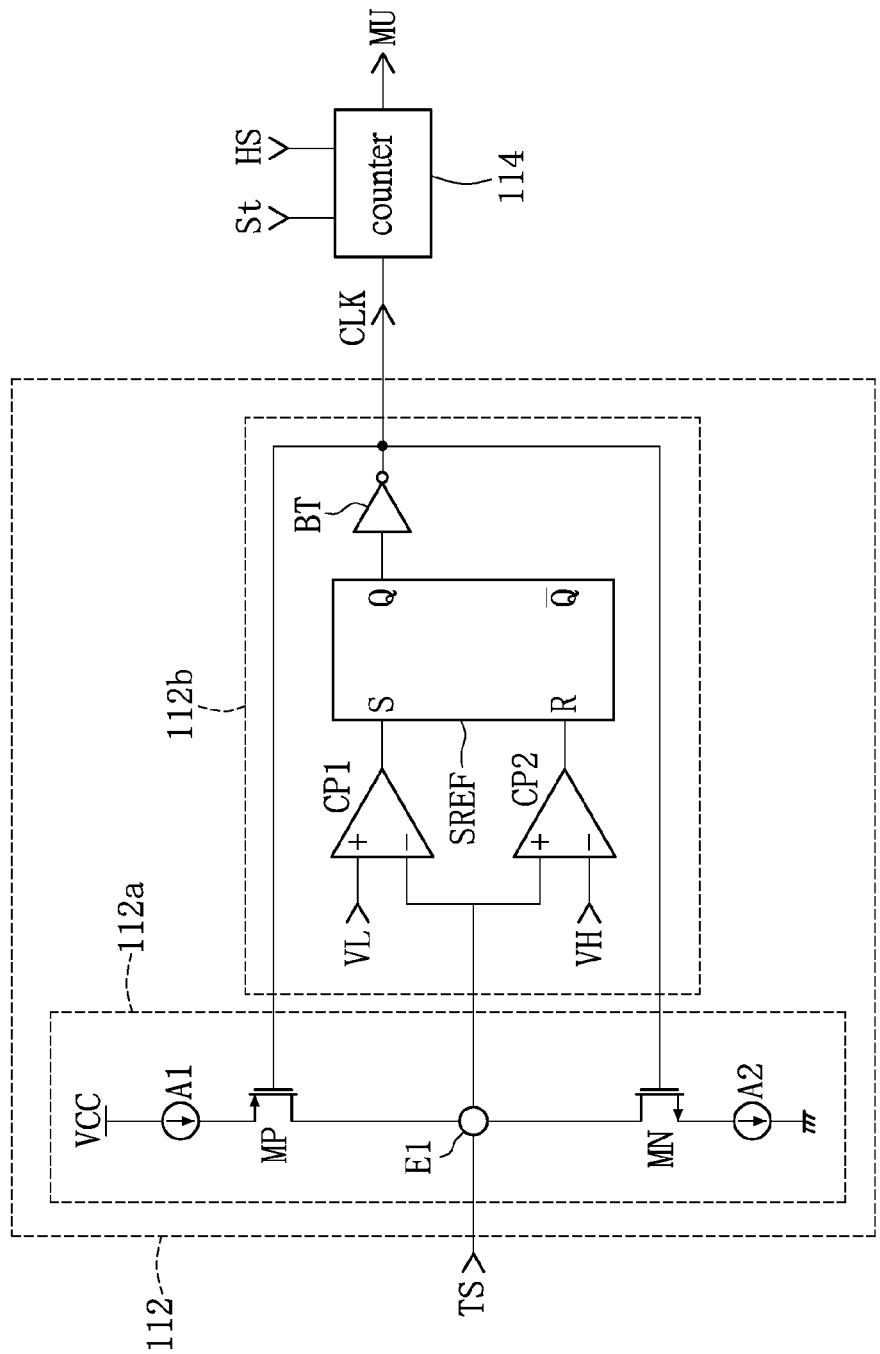
FIG. 3 shows a block diagram of a start controller according to an exemplary embodiment of the present disclosure.

Please refer to FIGS. 1 and 3. The start controller 110 includes an oscillator 112 and a counter 114. The oscillator 112 has a terminal E1. The terminal E1 is electrically connected to an external element 10. The oscillator 112 generates a charge-discharge signal from the terminal E1 according to the external element 10. Then the oscillator 112 transforms the charge-discharge signal TS into an oscillating clock signal CLK. In the present disclosure, the external element 10 is one or a combination of a capacitor and a resistor, or other external element generating the charge-discharge signal TS. The present disclosure is not limited thereto.

More specifically, the oscillator 112 includes a charge-discharge circuit 112a and a clock generator 112b. The charge-discharge circuit 112a electrically connects the clock generator 112b. The charge-discharge circuit 112a has a charging element and a discharging element. The terminal E1 is configured between the charging element and the discharging element. The charge-discharge circuit 112a charges or discharges the external component 10 through the terminal E1 to generate the charge-discharge signal TS at the terminal E1. In the present disclosure, the charging element has a P-type transistor MP and the discharging element has an N-type transistor MN. One end of the P-type transistor MP electrically connects to a power voltage VCC through a first current source A1. Another end of the P-type transistor MP electrically connects to one end of the N-type transistor MN to form the terminal E1. Another end of the N-type transistor MN electrically connects to a ground voltage GND through a second current source A2. The control end of the P-type transistor MP and the control end of the N-type transistor MN receive a logic voltage generated from the clock generator 112b and are controlled by the logic voltage. Therefore, when the logic voltage is low voltage, the P-type transistor MP is turned on and the N-type transistor MN is turned off, so that the first current source A1 charges the terminal E1. When the logic voltage is high voltage, the P-type transistor MP is turned off and the N-type transistor MN is turned on, so that the second current source A2 discharges the terminal E1.

Then the clock generator 112b receives the charge-discharge signal TS to generate the clock signal CLK. In the present disclosure, the clock generator 112b has a first comparator CP1, a second comparator CP2, SR flip-flop SRFF, and NOT gate BT. The non-inverting input terminal of the first comparator CP1 electrically connects to a low-voltage VL. The inverting input terminal of the first comparator CP1 and the non-inverting input terminal of the second comparator CP2 electrically connect to the terminal E1. The inverting input terminal of the second comparator CP2 electrically connects to a high-voltage VH. The output terminal of the first comparator CP1 and the output terminal of the second comparator CP2 respectively and electrically connect to the set terminal and the reset terminal of the SR flip-flop SRFF. The output terminal of the SR flip-flop SRFF electrically connects to the counter 114 through the NOT gate BT. The output terminal of the NOT gate BT electrically connects to the control terminal of the P-type transistor MP and the control terminal of N-type transistor MN, to turn on or turn off the P-type transistor MP and the N-type transistor MN according to the logic voltage outputted from the output terminal of the NOT gate BT (i.e., the clock signal CLK). Accordingly, the clock generator 112b determines the logic level of the charge-discharge signal TS, to generate the clock signal CLK to the counter 114.

Therefore, when the external element 10 is a capacitor, the charge-discharge circuit 112a charges or discharges the capacitor according to the logic voltage generated from the clock generator 112b, so that the charge-discharge signal TS of the terminal E1 is an oscillation signal. The clock generator 112b outputs the square wave as the clock signal CLK based on the oscillatory charge-discharge signal TS. The oscillator 112 can also be another circuit structure. In addition, if the terminal E1 can generate the oscillatory charge-discharge signal TS for a period of time without the oscillator 112, the oscillator 112 can be omitted. The present disclosure is not limited thereto.

Please return to FIG. 3. The counter 114 electrically connects to the oscillator 112. The counter 114 keeps counting the clock signal CLK in the start state (i.e., the duration after the counter 114 receiving the start signal St indicating start of the motor control circuit 100 and the duration before the counter 114 determining that there is the second level conversion of the hall signal HS). When the counter 114 counts a predefined frequency periodically, the counter 114 generates the commutation signal MU to the storage 130. For example, the predefined frequency is 100 units. Therefore, the counter 114 keeps counting the clock signal CLK, and when the counter 114 counts 100 clock signals CLK, the counter 114 generates the commutation signal MU. When the counter 114 determines that there is the second level conversion of the hall signal HS, the counter 114 stops generating the commutation signal MU to the storage 130.

Figure 4:
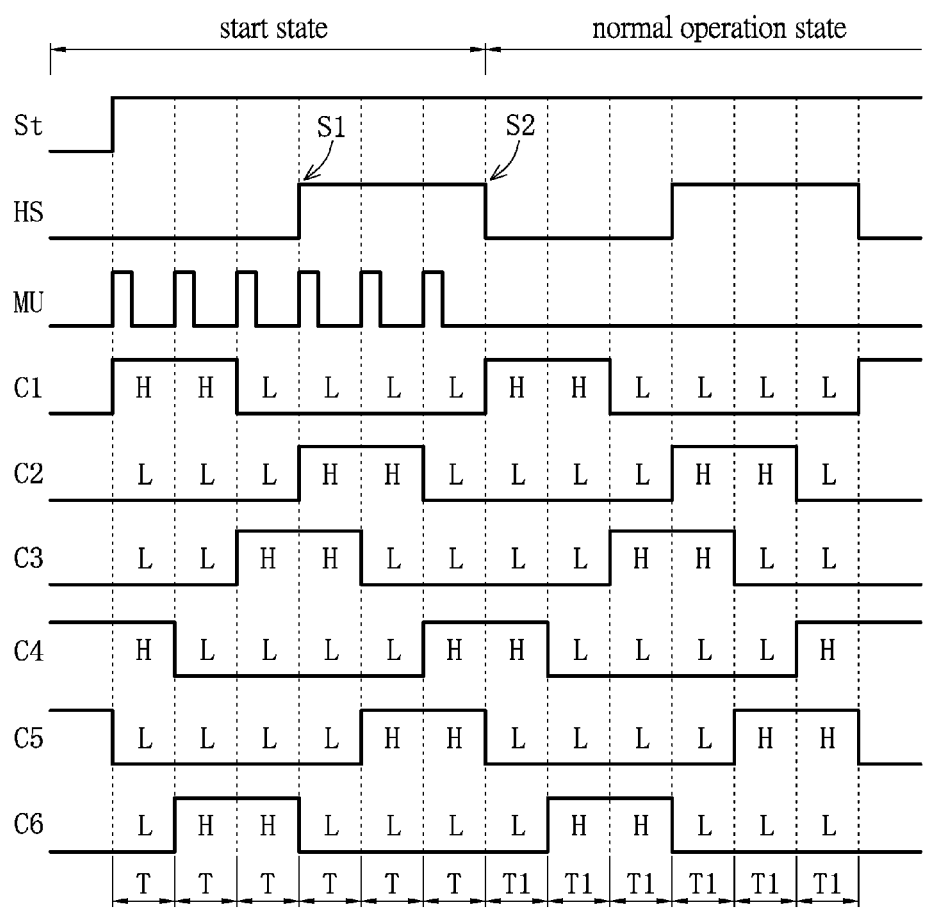
FIG. 4 shows a wave diagram of a motor control circuit positively rotating a three-phase motor according to an exemplary embodiment of the present disclosure.

Please refer to FIGS. 1 and 4. FIG. 4 shows a wave diagram of a motor control circuit positively rotating a three-phase motor according to an exemplary embodiment of the present disclosure. For explanatory convenience, the level of the control signals C1-C6 are shown in <Table 1> for the motor control circuit 100 positively rotating the three-phase motor M. Therefore, in the start state, when the start controller 110 receives a start signal St (e.g., the low level is transformed to the high level) indicating start of the motor control circuit 100, the start controller 110 periodically generates the commutation signal MU (in the present disclosure, the start controller 110 generates the commutation signal MU once every time interval T). At present, the storage 130 transmits the digital models in sequence starting from the first digital model (in the present disclosure, transmitting the first, the second, the third digital models in sequence) to the operation controller 120 according to the level of the commutation signal MU and the level of the hall signal HS. The operation controller 120 executes the phase switching of the full-bridge circuit 140 according to the digital models received in sequence, to drive the three-phase motor M.

As shown in FIG. 4, in the start state, when the start controller 110 determines that there is a first level conversion S1 of the hall signal HS (in the present disclosure, the low level is transformed to the high level), the start controller 110 periodically generates the commutation signal MU (in the present disclosure, the start controller 110 generates the commutation signal MU once every time interval T). At present, the storage 130 transmits the fourth, the fifth, and the sixth digital models in sequence to the operation controller according to the commutation signal MU and the level conversion S1. The operation controller 120 executes the phase switching of the full-bridge circuit 140 according to the digital models received in sequence, to drive the three-phase motor M.

When the three-phase motor M stops, the stator and the rotor are disposed opposite, in any of the positions of the magnetic poles of the three-phase motor M. Therefore, when the start controller 110 receives the start signal St indicating start of the motor control circuit 100, the start controller 110 may determine that there is a first level conversion S1 of the hall signal HS after the storage 130 transmitting one of the first, the second, and the third digital models in sequence, so that the start controller 110 early controls the storage 130 to transmit the fourth, the fifth, and the sixth digital models in sequence to the operation controller 120 (not shown in FIGs). For example, after the storage 130 transmits the first and the second digital models in sequence to the operation controller 120, the start controller 110 controls the storage 130 to transmit the fourth, the fifth, and the sixth digital models in sequence to the operation controller 120. For another example, after the storage 130 transmits the first digital model to the operation controller 120, the start controller 110 controls the storage 130 to transmit the fourth, the fifth, and the sixth digital models in sequence to the operation controller 120.

Therefore, in the start state, when the hall sensor 20 receives the start signal St indicating start of the motor control circuit 100, the start controller 110 controls the storage 130 to transmit the corresponding digital model to the operation controller 120 once every time interval (i.e., time interval T), so that the operation controller 120 accordingly executes the phase switching of the full-bridge circuit 140. When the hall sensor 20 senses that there is a first change of the position of the magnetic poles, the start controller 110 controls the storage 130 to transmit the corresponding digital models (i.e., the fourth, the fifth, and the sixth digital models) to the operation controller 120 once every time interval (i.e., time interval T), so that the operation controller 120 accordingly executes the phase switching of the full-bridge circuit 140. Therefore, the operation controller 120 will drive the three-phase motor M to positively rotate one cycle in the start state.

As shown in FIG. 4, in the start state, when the start controller 110 determines that there is a second level conversion S2 of the hall signal HS (i.e., the high level is transformed to the low level), the operation controller 120 averages a total time of the fourth, the fifth, and the sixth digital models to generate a switching time T1, and to enter the normal operation state. For example, the total time from the fourth to the sixth digital models is 6 ms. The switching time T1 is 6 ms/3=2 ms. When the motor control circuit 100 operates in the normal operation state, the operation controller 120 captures six digital models in sequence from the storage 130 once every switching time T1, and then executes the phase switching of the full-bridge circuit 140.

Therefore, in the normal operation state, the start controller 110 stops transmitting the commutation signal MU to the storage 130. The operation controller 120 captures the first, the second, the third, the fourth, the fifth, and the sixth digital models in sequence from the storage 130 once every switching time T1, to execute the phase switching of the full-bridge circuit 140 for positively rotating the three-phase motor M.

The first level conversion S1 of the hall signal HS can also be transformed from the high level to the low level and the second level conversion S2 of the hall signal HS can be also be transformed from the low level to the high level, i.e., the level of the aforementioned hall signal HS and the level of the hall signal HS shown in FIG. 4 are reversed. The present disclosure is not limited thereto.

Figure 5:
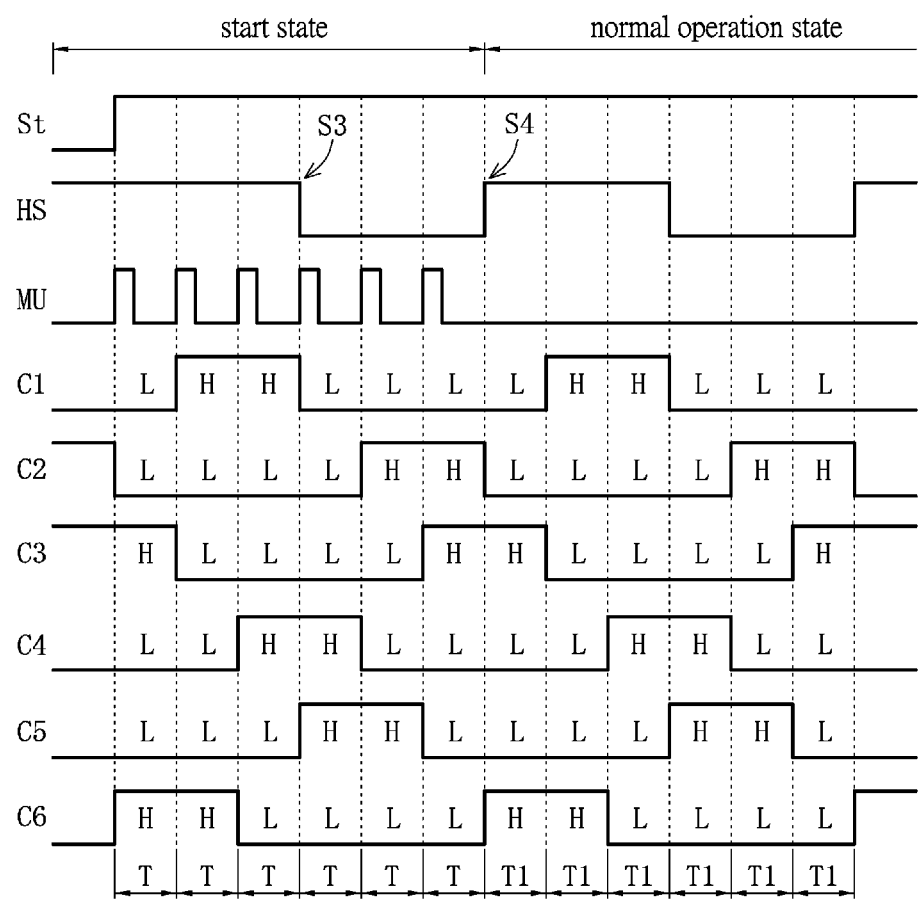
FIG. 5 shows a wave diagram of a motor control circuit negatively rotating a three-phase motor according to an exemplary embodiment of the present disclosure.

In another disclosure, the motor control circuit 100 may negatively rotate the three-phase motor M. Please refer to FIGS. 1 and 5. FIG. 5 shows a wave diagram of a motor control circuit negatively rotating a three-phase motor according to an exemplary embodiment of the present disclosure. For explanatory convenience, the level of the control signals C1-C6 are equally shown in <Table 1> for the motor control circuit 100 negatively rotating the three-phase motor M. Therefore, in the start state, when the start controller 110 receives a start signal St (e.g., the low level is transformed to the high level) indicating start of the motor control circuit 100, the start controller 110 periodically generates the commutation signal MU (in the present disclosure, the start controller 110 generates the commutation signal MU once every time interval T). At present, the storage 130 transmits the digital models in sequence starting from the fourth digital model (in the present disclosure, transmitting the fourth, the fifth, the sixth digital models in sequence) to the operation controller 120 according to the level of the commutation signal MU and the level of the hall signal HS (i.e., the high level in the present disclosure). The operation controller 120 executes the phase switching of the full-bridge circuit 140 according to the digital models received in sequence, to drive the three-phase motor M.

When the motor control circuit 100 operates in the start state and the start controller 110 determines that there is a first level conversion S3 of the hall signal HS (i.e., the high level is transformed to the high level in the present disclosure), the start controller 110 periodically generates the commutation signal MU (the start controller 110 generates the commutation signal MU once every time interval T in the present disclosure). At present, the storage 130 transmits the first, the second, and the third digital models in sequence to the operation controller 120 according to the commutation signal MU and the level conversion S3. The operation controller 120 executes the phase switching of the full-bridge circuit 140 according to the digital models received in sequence, to drive the three-phase motor M.

Similar to the aforementioned disclosure, when the three-phase motor M stops, the stator and the rotor are disposed opposite, in any of the six positions of the magnetic poles of the three-phase motor M. Therefore, when the start controller 110 receives the start signal St indicating start of the motor control circuit 100, the start controller 110 may determine that there is a first level conversion S3 of the hall signal HS after the storage 130 transmitting one of the fourth, the fifth, and the sixth digital models in sequence, so that the start controller 110 early controls the storage 130 to transmit the first, the second, and the third digital models in sequence to the operation controller 120 (not shown in FIGs). For example, after the storage 130 transmits the fourth and the fifth digital models in sequence to the operation controller 120, the start controller 110 controls the storage 130 to transmit the first, the second, and the third digital models in sequence to the operation controller 120. For another example, after the storage 130 transmits the fourth digital model to the operation controller 120, the start controller 110 controls the storage 130 to transmit the first, the second, and the third digital models in sequence to the operation controller 120.

Therefore, in the start state, when the hall sensor 20 receives the start signal St indicating start of the motor control circuit 100, the start controller 110 controls the storage 130 to transmit the corresponding digital model to the operation controller 120 once every time interval (i.e., time interval T), so that the operation controller 120 accordingly executes the phase switching of the full-bridge circuit 140. When the hall sensor 20 senses that there is a first change of the position of the magnetic poles, the start controller 110 controls the storage 130 to transmit the corresponding digital models (i.e., the first, the second, and the third digital models) to the operation controller 120 once every time interval (i.e., time interval T), so that the operation controller 120 accordingly executes the phase switching of the full-bridge circuit 140. Therefore, the operation controller 120 will drive the three-phase motor M to negatively rotate one cycle in the start state.

When the motor control circuit 100 operates in the start state and the start controller 110 determines that there is a second level conversion S4 of the hall signal HS (i.e., the low level is transformed to the high level), the operation controller 120 averages a total time of the first, the second, and the third digital models to generate a switching time T1, and to enter the normal operation state. For example, the total time from the first to the third digital models is 6 ms. The switching time T1 is 6 ms/3=2 ms. When the motor control circuit 100 operates in the normal operation state, the operation controller 120 captures six digital models in sequence from the storage 130 once every switching time T1, and then executes the phase switching of the full-bridge circuit 140.

Therefore, in the normal operation state, the start controller 110 stops transmitting the commutation signal MU to the storage 130. The operation controller 120 captures the fourth, the fifth, the sixth, the first, the second, and the third digital models in sequence from the storage 130 once every switching time T1, to execute the phase switching of the full-bridge circuit 140 to negatively rotate the three-phase motor M.

If the motor control circuit 100 wants to have the function of positively and negatively rotating the three-phase motor M, this may utilize the start control 110 determining that there is which change in the first and the second level conversions, to positively or negatively rotate the three-phase motor M. Therefore, when the motor control circuit 100 positively rotates the three-phase motor M, the start control 110 determines that the first level conversion is transformed from the low level to the high level and the second level conversion is transformed from the high level to the low level. When the motor control circuit 100 negatively rotates the three-phase motor M, the start control 110 determines that the first level conversion is transformed from the high level to the low level and the second level conversion is transformed from the low level to the high level. The judgment mechanism of positively rotating the three-phase motor M and that of negatively rotating the three-phase motor M can be changed, and the present disclosure is not limited thereto.

In summary, the invention provides a motor control circuit, which utilizes one hall sensor to sense the position of magnetic poles of the three-phase motor and operates the three-phase motor by a phase switching mechanism. Therefore, the motor control circuit may utilize one hall sensor to achieve the phase commutation of the magnetic poles of the three-phase motor, thereby miniaturizing the three-phase motor.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:
1. A motor control circuit, adapted for driving a three-phase motor from a start state to a normal operation state, and the motor control circuit comprising:

a full-bridge circuit, electrically connected to the three-phase motor;

a hall sensor, configured close to the three-phase motor, and configured for sensing a position of magnetic poles of the three-phase motor to generate a hall signal;

a storage, electrically connected to the hall sensor and configured for storing six digital models, the six digital models having sequential relationship and being associated with a phase switching of the full-bridge circuit, to provide the operation of the three-phase motor;

a start controller, electrically connected to the hall sensor and the storage; and an operation controller, electrically connected to the hall sensor, the storage, and the full-bridge circuit;

wherein in the start state, when the start controller receives a start signal indicating start of the motor control circuit, the start controller periodically generates a commutation signal, the storage transmits the digital models in sequence to the operation controller starting from the first digital model according to the level of the commutation signal and the level of the hall signal, and the operation controller executes the phase switching of the full-bridge circuit according to the digital models received in sequence, to drive the three-phase motor;

wherein in the start state, when the start controller determines that there is a first level conversion of the hall signal, the start controller periodically generates the commutation signal, the storage transmits the fourth, the fifth, and the sixth digital models in sequence to the operation controller according to the commutation signal and the level conversion, and the operation controller executes the phase switching of the full-bridge circuit according to the digital models received in sequence, to drive the three-phase motor;

wherein in the start state, when the start controller determines that there is the second level conversion of the hall signal, the operation controller averages a total time of the fourth, the fifth, and the sixth digital models to generate a switching time, and to enter the normal operation state, wherein in the normal operation state, the operation controller captures six digital models in sequence from the storage once every switching time, and executes the phase switching of the full-bridge circuit according to the switching time.

2. The motor control circuit according to claim 1, wherein the start controller comprises:

an oscillator, having a terminal, the terminal electrically connected to an external element, the oscillator configured for generating a charge-discharge signal from the terminal according to the external element, and configured for transforming the charge-discharge signal into an oscillating clock signal; and a counter, electrically connected to the oscillator, wherein the counter keeps counting the clock signal in the start state, and when the counter counts a predefined frequency periodically, the counter generates the commutation signal to the storage.

3. The motor control circuit according to claim 2, wherein when the counter determines that there is the second level conversion of the hall signal, the counter stops generating the commutation signal to the storage.

4. The motor control circuit according to claim 2, wherein the oscillator comprises:

a charge-discharge circuit, having a charging element and a discharging element, the terminal configured between the charging element and the discharging element, and the charge-discharge circuit charges or discharges the external element through the terminal, to generate the charge-discharge signal from the terminal; and a clock generator, electrically connected to the charge-discharge circuit, and receiving the charge-discharge signal, to generate the clock signal.

5. The motor control circuit according to claim 2, wherein the external element is one or a combination of a capacitor and a resistor.

6. The motor control circuit according to claim 1, wherein the first level conversion of the hall signal indicates that the hall signal is transformed from a low level to a high level, and the second level conversion of the hall signal indicates that the hall signal is transformed from the high level to the low level.

7. The motor control circuit according to claim 1, wherein the first level conversion of the hall signal indicates that the hall signal is transformed from a high level to a low level, and the second level conversion of the hall signal indicates that the hall signal is transformed from the low level to the high level.

8. A motor control circuit, adapted for driving a three-phase motor from a start state to a normal operation state, and the motor control circuit comprising:

a full-bridge circuit, electrically connected to the three-phase motor;

a hall sensor, configured close to the three-phase motor, and configured for sensing a position of magnetic poles of the three-phase motor to generate a hall signal;

a storage, electrically connected to the hall sensor and configured for storing six digital models, the six digital models having sequential relationship and being associated with a phase switching of the full-bridge circuit, to provide the operation of the three-phase motor;

a start controller, electrically connected to the hall sensor and the storage; and an operation controller, electrically connected to the hall sensor, the storage, and the full-bridge circuit;

wherein in the start state, when the start controller receives a start signal indicating start of the motor control circuit, the start controller periodically generates a commutation signal, the storage transmits the digital models in sequence to the operation controller starting from the fourth digital model according to the level of the commutation signal and the level of the hall signal, and the operation controller executes the phase switching of the full-bridge circuit according to the digital models received in sequence, to drive the three-phase motor;

wherein in the start state, when the start controller determines that there is a first level conversion of the hall signal, the start controller periodically generates the commutation signal, the storage transmits the first, the second, and the third digital models in sequence to the operation controller according to the commutation signal and the level conversion, and the operation controller executes the phase switching of the full-bridge circuit according to the digital models received in sequence, to drive the three-phase motor;

wherein in the start state, when the start controller determines that there is the second level conversion of the hall signal, the operation controller averages a total time of the first, the second, and the third digital models to generate a switching time, and to enter the normal operation state, wherein in the normal operation state, the operation controller captures six digital models in sequence from the storage once every switching time, and executes the phase switching of the full-bridge circuit according to the switching time.

9. The motor control circuit according to claim 8, wherein the start controller comprises:

an oscillator, having a terminal, the terminal electrically connected to an external element, the oscillator configured for generating a charge-discharge signal from the terminal according to the external element, and configured for transforming the charge-discharge signal into an oscillating clock signal; and a counter, electrically connected to the oscillator, wherein the counter keeps counting the clock signal in the start state, when the counter counts a predefined frequency periodically, the counter generates the commutation signal to the storage, and when the counter determines that there is the second level conversion of the hall signal, the counter stops generating the commutation signal to the storage.

10. The motor control circuit according to claim 9, wherein the external element is one or a combination of a capacitor and a resistor.

\* \* \* \* \*